United States Patent [19]

Shinozaki et al.

[11] Patent Number: 5,028,946
[45] Date of Patent: Jul. 2, 1991

[54] SHUTTER FOR A SINGLE LENS REFLEX CAMERA

[75] Inventors: Nobuo Shinozaki; Hiroto Tsuyuki; Yoichi Nakano; Seiichi Imano, all of Yotsukaido, Japan

[73] Assignee: Seikosha Co., Ltd., Japan

[21] Appl. No.: 539,788

[22] Filed: Jun. 18, 1990

[30] Foreign Application Priority Data

Jun. 27, 1989 [JP] Japan .............................. 1-75055[U]

[51] Int. Cl.$^5$ .............................................. G03B 9/10
[52] U.S. Cl. ................................... 354/250; 354/259
[58] Field of Search .............. 354/250, 251, 252, 253, 354/256, 259, 261, 262, 263, 264, 265

[56] References Cited

U.S. PATENT DOCUMENTS 4,193,678  3/1980  In Son ............................ 354/250 X
4,893,142  1/1990  Ishida et al. ..................... 354/262 X Primary Examiner—Brian W. Brown
Assistant Examiner—Howard B. Blankenship
Attorney, Agent, or Firm—Bruce L. Adams; Van C. Wilks

[57] ABSTRACT

A shutter for a single lens reflex camera, comprises a drive gear rotatable in opposite directions by a motor and having a non-tooth portion, a control gear directly or indirectly engageable with the drive gear, shutter blades driven by the control gear to open and close a shutter opening, and a spring for constantly biasing the control gear in a direction to close the shutter opening. Upon rotation of the drive gear, the control gear is rotated to face the non-tooth portion of the drive gear whereby the shutter blades are moved under the action of the spring to close the shutter opening. When the control gear is brought into meshing engagement with the drive gear, the shutter blades are rendered operative to open and close the shutter opening.

1 Claim, 5 Drawing Sheets

SHUTTER FOR A SINGLE LENS REFLEX CAMERA

BACKGROUND OF THE INVENTION

1. Field of the Invention

The present invention relates to a photographic shutter for use in a single lens reflex camera wherein a motor is used to drive shutter blades in an exposure mode of operation.

2. Description of the Related Art

Upon depression of a shutter release button, a stepper motor is rotated in a clockwise direction to incrementally drive shutter blades from a closed orientation to an open orientation. When the level of a shutter aperture or opening has reached a value corresponding to the intensity of the scene brightness and the like, the stepper motor is rotated in a reverse or counterclockwise direction so as to close the shutter by the shutter blades. Such a shutter has been used as a lens shutter in a compact camera wherein a viewfinder is used to compose the content of a picture, said viewfinder having a path of light similar to that of an objective lens.

Unlike a focal plane shutter, such a lens shutter may conveniently be operated in synchronized relation to an electronic strobe in a flash exposure mode of operation. If the lens shutter is used in a signle lens reflex camera, then shutter blades must be kept open when a photographer composes the content of a picture through an objective lens. When the shutter release button is thereafter depressed, the shutter blades will be returned to a closed orientation. The stepper motor is then rotated to open and close the shutter blades in response to the intensity of the scene brightness and the like to complete an exposure mode of operation. If the shutter blades are turned to a closed orientation once the stepper motor, then the initiation of an actual exposure mode of operation is delayed as the limit of speed of the stepper motor M depends upon the nature of the stepper motor at high speeds. As a result, the content of an actual picture may differ from that of a picture that a photographer originally intends to compose.

In order to overcome the foregoing problems, the applicant of the present application previously proposed an improved shutter for use in a single lens reflex camera as shown in FIGS. 5 and 6 (see Japanese laid-open patent publication No. Sho 64/44924).

Specifically, the shutter includes a plurality of shutter blades (only one blade is shown in FIG. 5) designated at 101 and operable to open and close a shutter opening 102. A control member 103 is connected to the shutter blade 101 by a pin. Attached to one side of the control member 103 is a spring 104 by which the control member 103 is rotated in a clockwise direction. The control member 103 has another pin 105 at its other side.

A drive member 106 is operatively engaged with a stepper motor 108 and has a cam 107 which is, in turn, engageable with the pin 105. An engaging member 109 is rotatable around the axis of the drive member 106 and is engageable with the control member 103.

When the focus of an objective lens has been adjusted through the shutter opening 102, a shutter release button is depressed. The stepper motor 108 is correspondingly rotated in a counterclockwise direction between time $t_0$ and time $t_1$ as shown in FIG. 6. This causes the drive member 106 to move to the right as viewed in FIG. 5. Upon such movement of the drive member 106, the engaging member 109 is rotated to disengage from the control member 103. As a result, the control member 103 is rotated under the action of the spring 104 to allow the shutter blade 101 to rapidly close the shutter opening 102.

The stepper motor 108 is rotated in a clockwise direction between time $t_1$ to $t_4$ so as to move the drive member 106 to the left as viewed in FIG. 5. The pin 105 is then moved along the cam 107 to cause the shutter blade 101 to gradually open the shutter opening 102. When the appropriate exposure has been obtained (time $t_4$), using information on the level of the available scene light and the like, the stepper motor 108 is again rotated in a reverse direction. The pin 105 then follows the cam 107 whereby the control lever 103 is operative to allow the shutter blade 101 to close the shutter opening 102. This completes an exposure mode of operation.

With such a conventional single lens reflex camera, the pin 105 of the control member 103 moves into contact with the cam 107 so that the control member 103 can be rotated to open and close the shutter blade 101. This arrangement requires that the stepper motor 108 be rapidly rotated in a reverse direction to drive the shutter blade to a fully open orientation and then rapidly return the same to a closed orientation. The resultant inertia may cause separation of the pin 105 from the cam 107. In other words, if the stepper motor 108 is rapidly rotated in a reverse direction, then the opening and closing of the shutter blade 101 may be delayed. The shutter blade 101 will not follow the stepper motor 108 during high speed rotation. Accordingly, the correct exposure can not be achieved.

To this end, the biasing force of the spring 104 may be increased so as not to separate the pin 105 from the cam 107. However, this results in an increase in the friction between the pin 105 and the cam 107. Also, stepper motor 108 is subject to greater loads. This deteriorates high speed performance of the stepper motor 108 and consumes greater electric current.

In an exposure mode of operation, when the shutter release button is depressed, the stepper motor 108 is rotated in a reverse direction to close the shutter opening 102 by the shutter blade 101. Subsequently, the stepper motor 108 is rotated in a clockwise direction and then in a reverse or counterclockwise direction to open and close the shutter blade 101. In other words, the stepper motor 108 is rotated in a reverse direction to close the shutter blade 101 and immediately thereafter, is rotated in a clockwise direction to open the shutter blade 101. Such a rapid change in the direction of rotation of the stepper motor 108 presents a problem that shutter blade 101 can not immediately respond to the operation of the shutter release button.

In order to overcome the foregoing problems, a shutter for a single lens reflex camera according to the present invention comprises a drive gear rotatable in opposite directions by a motor and having a non-tooth portion, a control gear directly or indirectly engageable with the drive gear, shutter blades driven by the control gear to open and close a shutter opening, and biasing means for constantly biasing the control gear in a direction to close the shutter opening, wherein upon rotation of the drive gear, the control is rotated to face the non-tooth portion of the drive gear whereby the shutter blades are moved under the action of the biasing means to close the shutter opening, and wherein when the control gear is brought into meshing engagement with the drive gear, the shutter blades are rendered operative to open and close the shutter opening.

The control gear is subject to an inertia resulting from rapid opening and closing of the the shutter blades, but positively follows the drive gear since they are directly or indirectly in mesh with one another. The shutter blades can be therefore opened and closed without delay if the direction of rotation of the stepper motor is rapidly reversed.

The biasing force of the existing spring needs not be increased to improve the performance of the shutter blades in response to the stepper motor at high speeds. This avoids application of excessive loads to the stepper motor.

Upon depression of a shutter release button, the stepper motor is rotated in a clockwise direction. This causes the control gear to face the non-tooth portion of the drive gear to thereby drive the shutter blades toward a closed orientation. Thereafter, the stepper motor continues to rotate in the same direction, and then is rotated in an opposite directional sense to open and close the shutter blades. That is, the stepper motor is rotated in a clockwise direction to drive the shutter blades toward a closed orientation once and immediately thereafter, continues to rotate in the same or clockwise direction.

BRIEF DESCRIPTION OF THE DRAWINGS

A better understanding of the present invention may be had by reference to the following description of preferred embodiments when taken in conjunction with the accompanying drawings, in which.

DESCRIPTION OF THE PREFERRED EMBODIMENTS

Figure 1:
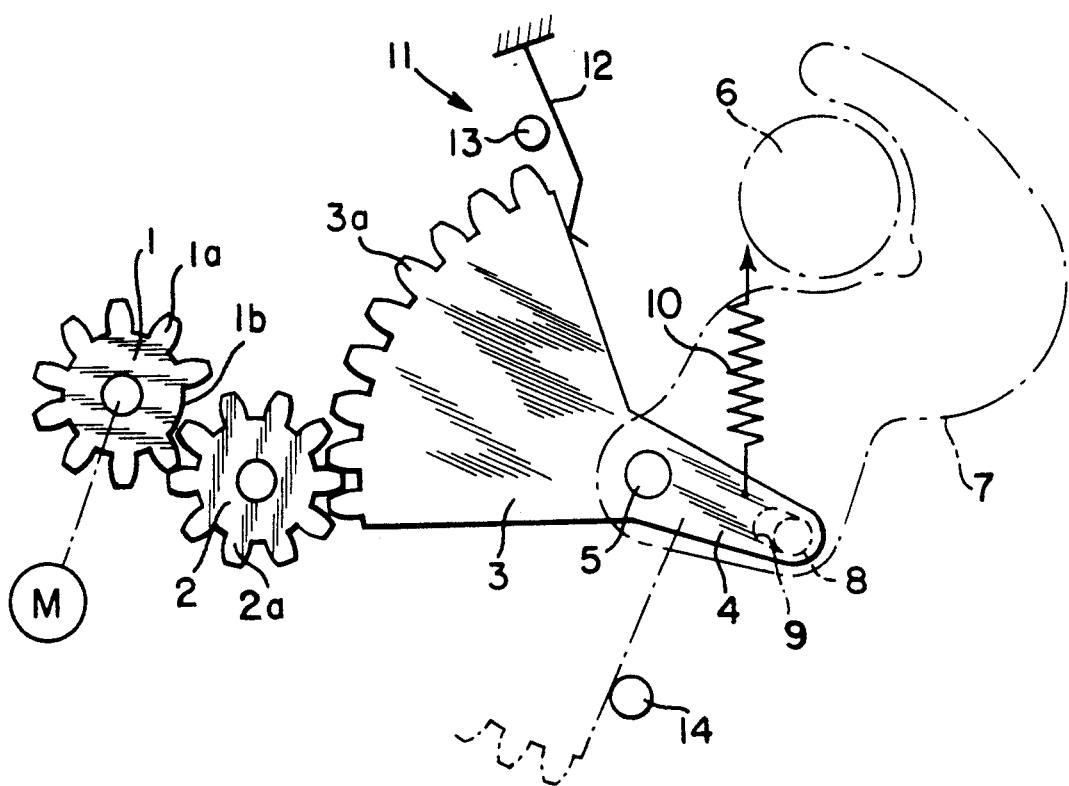
FIG. 1 is a plan view of a shutter for a single lens reflex camera constructed according to one embodiment of the present invention, the shutter being held in its initial position before a release button is depressed.
Figure 2:
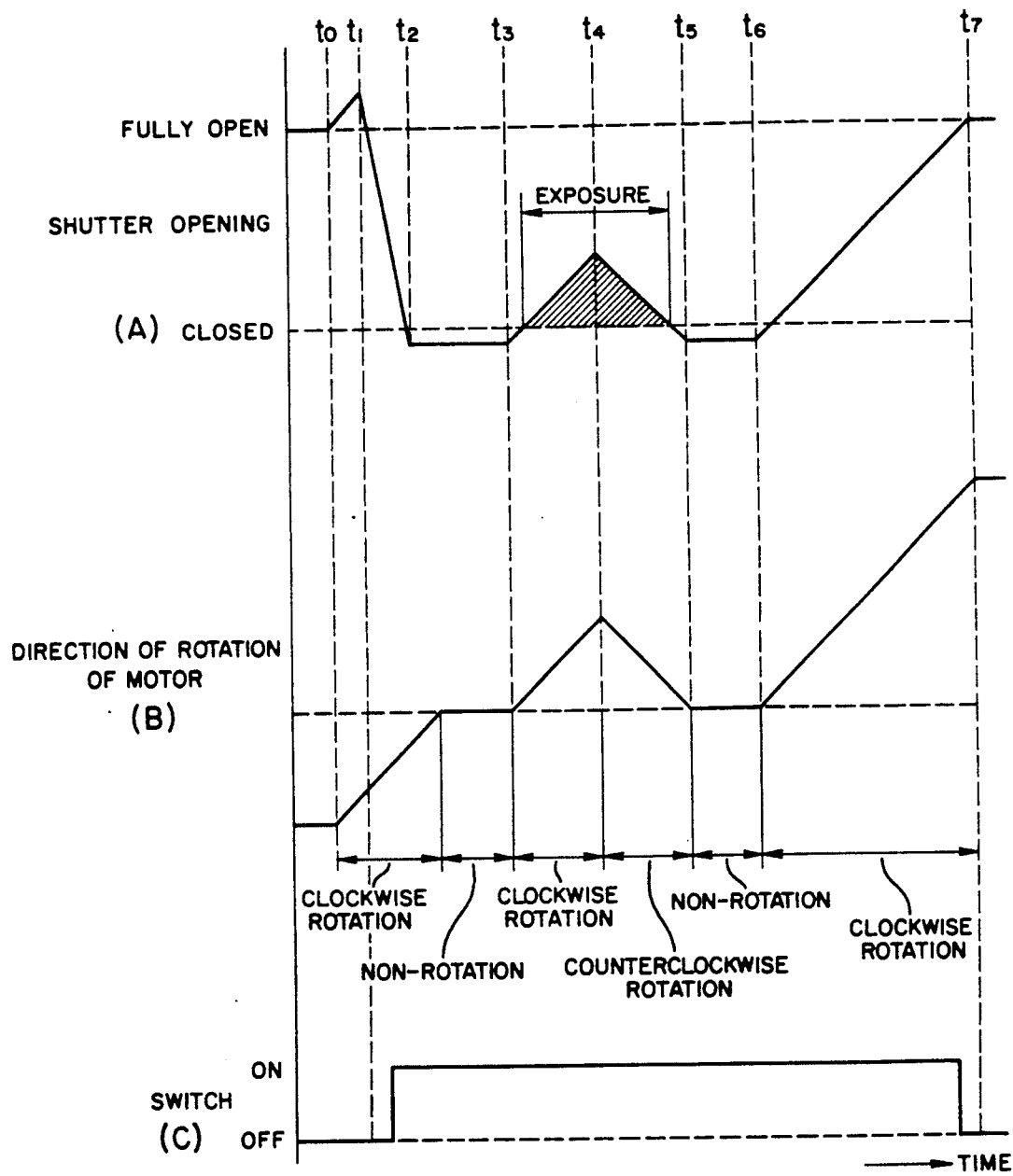
FIG. 2 is a graph representing the relationship between the time and the shutter opening or the direction of rotation of a motor for the shutter shown in FIG. 1.

FIGS. 1 to 3 show a shutter for a single lens reflex camera according to a first embodiment of the present invention.

With reference to FIG. 1, a drive gear 1 is rotatably supported on a fixed base plate (not shown) and is operatively connected to an output shaft of a stepper motor M. The stepper motor M is rotated according to predetermined lens aperture and shutter speed as programmed by a control circuit (not shown). The drive gear 1 is in meshing engagement with an adjacent idler gear 2 and includes a plurality of teeth 1a and a non-tooth portion 1b which in no way engages the idler gear 2. The idler gear 2 has a plurality of circumferentially spaced teeth 2a for meshing engagement with the drive gear 1 and control gear 3. The control gear 3 is generally of a sectorial shape and has an integral arm 4 at its base end. A plurality of teeth 3a on the control or sector gear 3 are in mesh with the teeth 2a of the idler gear 2. A pin 5 is substantially centrally disposed on the control gear 3. The control gear 3 is rotatably supported on the fixed base plate by the pin 5.

Rotatably connected to the pin 5 of the control gear 3 is a shutter blade 7 for opening and closing a shutter aperture or opening 6. The arm 4 of the control gear 3 has a pin 8 which is loosely fitted in an elongated slot of the shutter blade 7. Two shutter blades are symmetrically disposed with respect to the shutter opening 6, but reference is made only to the shutter blade 7.

A spring 10 (biasing means) is attached to the arm 4 of the control gear 3 to bias the arm 4 toward the shutter opening 6. Thus, the control gear 3 is constantly biased in such a manner as to rotate in a counterclockwise direction. The spring 10 provides a biasing force by which the control gear 3, the idler gear 2 and the drive gear 1 can be rotated, but such rotation is restricted by a holding torque of the stepper motor M. A switch 11 is located adjacent to the control gear 3 and includes a movable element 12 and a fixed element 13, the two elements being cooperative to detect the angular position of the control gear 3. The switch 11 is connected to the control circuit. The movable element 12 is separated from the fixed element 13 (off) prior to the operation of the release button and is kept in contact therewith (on) during the operation of the release button.

Illustratively, the control gear 3 is indirectly in meshing engagement with the drive gear 1, that is, through the idler gear 2. The control gear 3 may alternatively be in direct engagement with the drive gear 1.

OPERATION

FIG. 2 is a graph representing the relationship between the time and the direction of rotation of the stepper motor M, and between the time and the shutter opening. Operation of the shutter will be described with reference to FIG. 2.

When the focus of an objective lens has been adjusted through the shutter opening, the release button is depressed. This causes the control circuit to establish appropriate lens aperture and shutter speed based on information relating to the level of available scene light and light sensitivity of a film and so on and determine the operating condition of the stepper motor M.

Figure 3A:
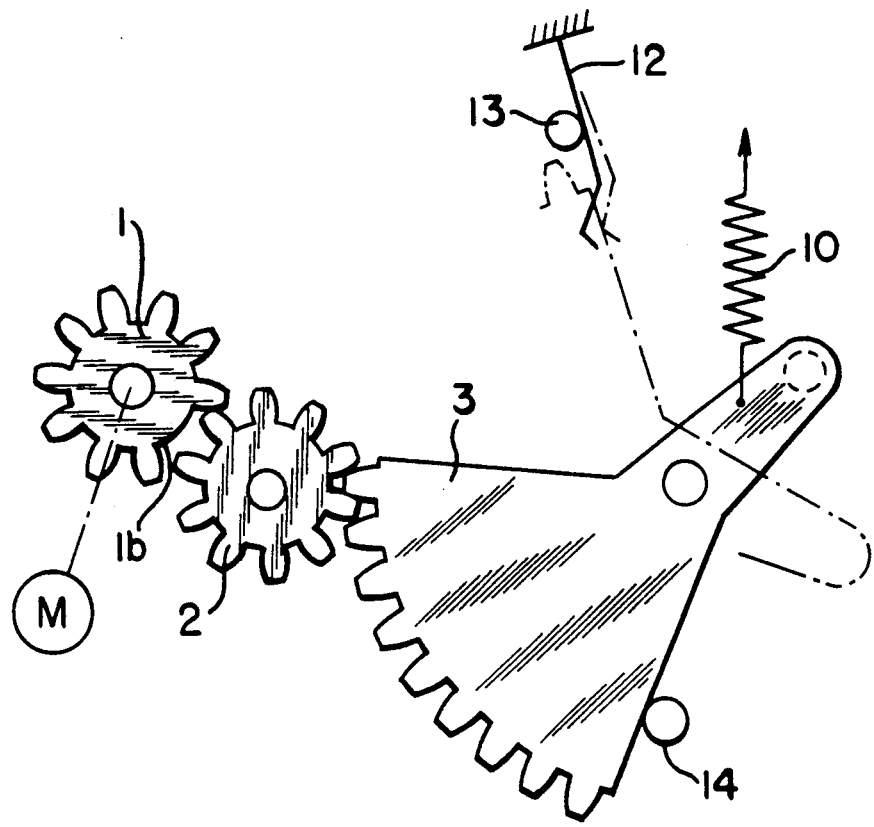
FIGS. 3A and 3B are schematic views showing the operation of the shutter for a single lens reflex camera.

In FIG. 1, the release button has not been depressed, and the shutter is held in its initial position. At time $t_0$, the stepper motor M is rotated in a clockwise direction so as to rotate the drive gear in the same direction. This causes the control gear 3 to rotate in the same or a clockwise direction through the idler gear 2. When the control gear 3 is thus operative to sightly open the shutter blade 7 (time $t_1$), the teeth 2a of the idler gear 2 is positioned to face the non-tooth portion 1b of the drive gear 1 whereby the idler gear 2 is disengaged from the drive gear 1. A torque will no longer act on the control gear 3. The control gear 3 is thus rotated in a counterclockwise direction under the action of the spring 10 to allow the shutter blade 7 to close the shutter opening 6 (time $t_2$). The control gear 3 is stopped when it is brought into contact with a stopper 14 in the form of a pin as shown in FIG. 3A.

Figure 3B:
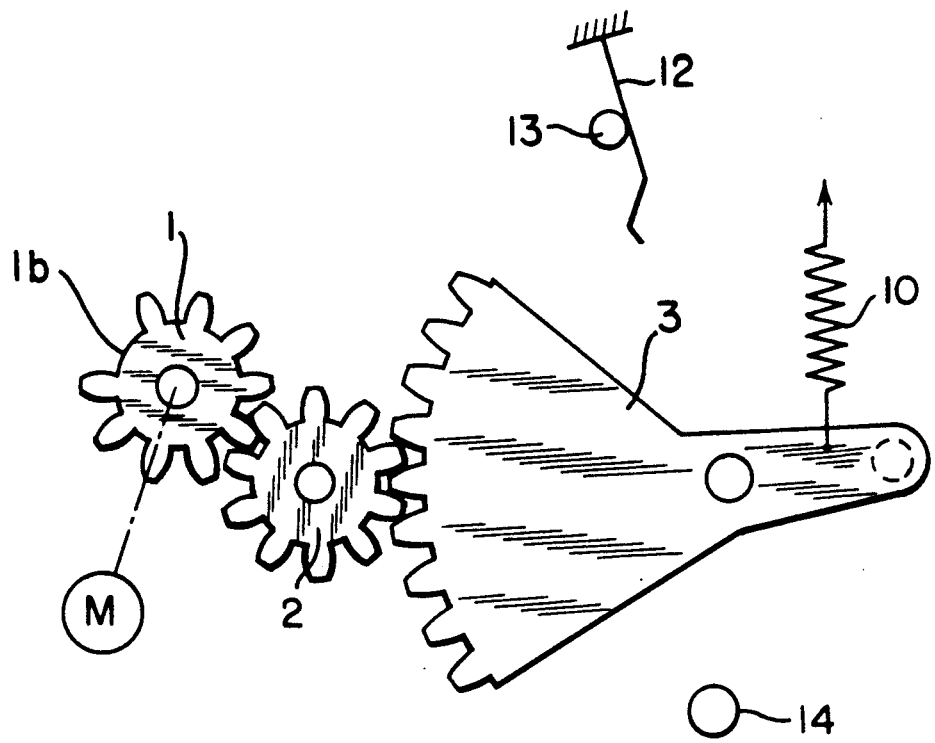

The stepper motor M remains inoperative between time $t_2$ and time $t_3$ during which a quick-return mirror is rotated to deviate from the path of light. The stepper motor M is again rotated in a clockwise direction to cause the teeth 1a of the drive gear 1 to move into meshing engagement with the teeth 2a of the idler gear 2 as shown in FIG. 3B. This causes the control gear 3 to rotate in a clockwise direction against the action of the spring 10 to drive the shutter blade 7 from a closed orientation to an open orientation. When the appropriate exposure has been obtained (time t₄), using information on the intensity of the scene brightness and the like, the stepper motor M is rapidly rotated in a reverse direction so as to rotate the control gear 3 in a counterclockwise direction. This causes the shutter blade 7 to close the shutter opening 6, completing an exposure mode of operation.

The stepper motor M is stopped when the shutter blade 7 has completely closed the shutter opening 6 (time t₅). During the stoppage of the stepper motor M, the quick-return mirror is rotated to return to the path of light (time t₆). The stepper motor M is again rotated in a clockwise direction to allow the shutter blade 7 to open the shutter opening 6. It is now possible to compose the content of a picture through the objective lens.

When the shutter blade 7 is moved to a fully open orientation and then, rapidly returned to a closed orientation, the resulting inertia may be imposed on the control gear 3. However, as the teeth of the drive gear 1 is in indirect engagement with the teeth 3a of the control gear 3, the control gear 3 will positively follow the drive gear 1. Therefore, the shutter blade 7 can be opened and closed without delay regardless of rapid reverse rotation of the stepper motor M. Such an improved operation of the shutter blade 7 allows the shutter blade 7 to open and close in response to programmed lens aperture and shutter speed. The correct exposure can thus be achieved.

It will be noted that a backlash may occur between the drive gear 1 and the idler gear 2, and between the idler gear 2 and the control gear 3. When the shutter blade 7 is moved to an open orientation and is returned to a closed orientation, the resultant inertia may be imposed on portions of the three gears 1, 2 and 3 where that backlash exists. However, such inertia is negligible and will not affect the operation of the shutter blade.

Also, according to the present invention, the biasing force of the existing spring need not be increased in an effort to provide an improved operation of the shutter blade in response to the stepper motor M at high speeds. This avoids application of excessive loads of the stepper motor M, thus improving the high speed performance of the stepper motor M and minimizing the consumption of electric current.

The spring 10 has been used to unidirectionally bias the control gear 3 so as to eliminate possible backlash between the drive gear 1 and the idler gear 2, and between the idler gear 2 and the control gear 3. This arrangement provides better exposure control.

Upon depression of the shutter release button, the stepper motor M is first rotated in a clockwise direction to drive the shutter blade 7 toward a closed orientation. The stepper motor M is subsequently rotated in the same direction and immediately thereafter in a reverse direction to open and close the shutter blade 7. In other words, the stepper motor M is rotated in a clockwise direction to drive the shutter blade 7 toward a closed orientation and immediately thereafter continues to rotate in the same direction. Thus, the shutter blade is highly responsive to the operation of the shutter release button to thereby properly carry out an exposure mode of operation.

The switch 11 is off at time t₁ and then turned on at time t₂ as the control gear 3 is rotated. Also, the switch 11 is on at time t₆ and then turned off at time t₇. In this way, malfunction of the shutter can be detected.

Figure 4:
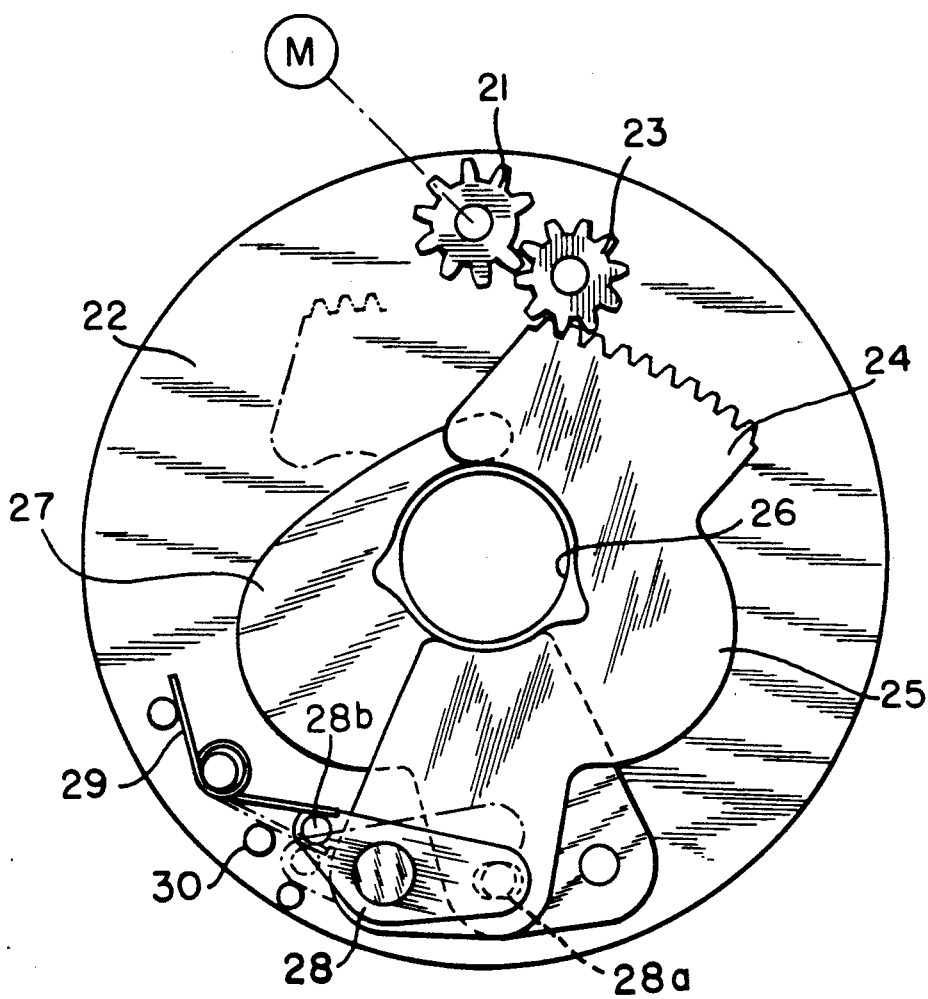
FIG. 4 is a plan view of a shutter for a single lens reflex camera according to another embodiment of the present invention.
Figure 5:
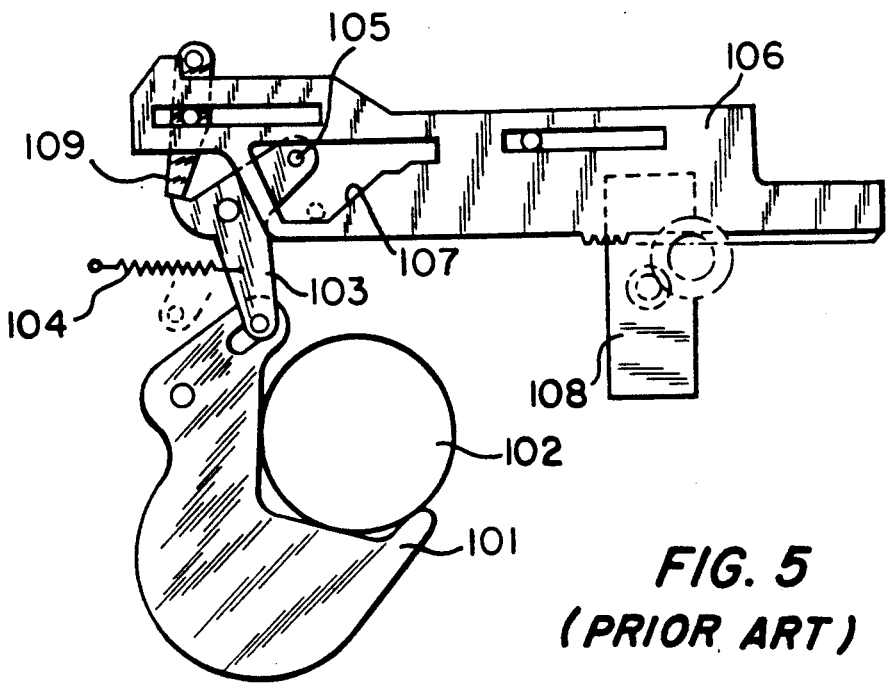
FIG. 5 is a plan view of a conventional shutter for a single lens reflex camera.
Figure 6:
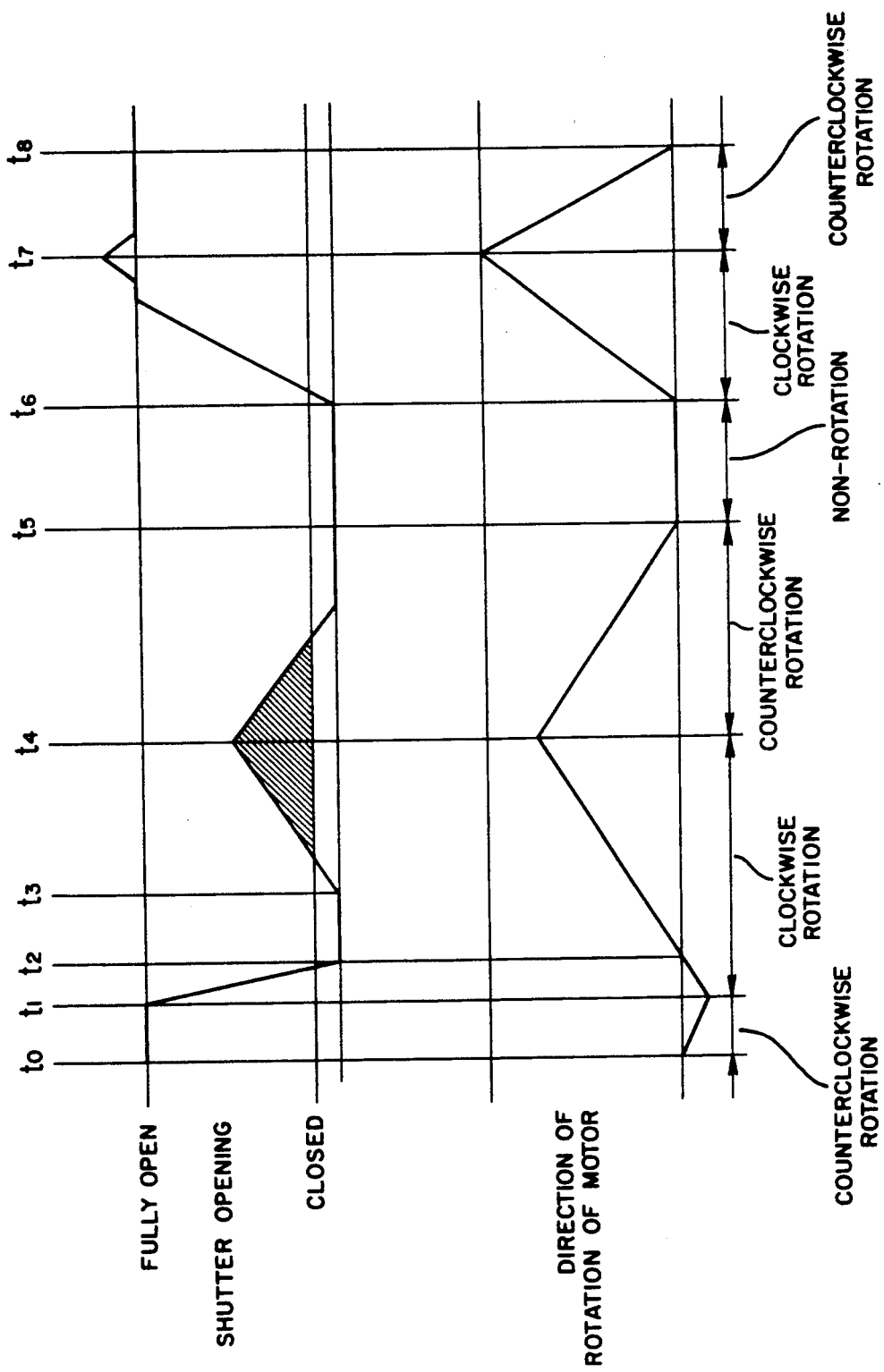
FIG. 6 is graph representing the relationship between the time and the shutter opening or the direction of rotation of a motor for the shutter shown in FIG. 5.

FIG. 4 shows a shutter for a single lens reflex camera, according to a second embodiment of the present invention. With reference to FIG. 4, a drive gear 21 is rotatably supported on a fixed base plate 22 and has a non-tooth portion, said drive gear being rotatable in opposite directions by the stepper motor M. The drive gear 21 is in mesh with a control gear 24 via an idler gear 23. The control gear 24 is integrally formed with a shutter blade 25. Another shutter blade 27 is mounted to the base plate 22, the two shutter blades 25 and 27 being symmetrically disposed with respect to a shutter opening 26.

A connecting lever 28 has at one end a pin 28a by which the two shutter blades 25 and 27 are interconnected to one another. The two shutter blades 25 and 27 are rotated together to open and close the shutter opening 26. The connecting lever 28 has at the other end a pin 28b with which a coil spring 29 is engaged. The coil spring 29 is made of an electrically conductive material and cooperates with a fixed contact 30 to provide a switch 31.

The shutter of the second embodiment is different from the shutter of the first embodiment particularly in that the shutter blade 25 is integral with the drive gear 24, and that the coil spring 29 acts as a switch, but the operation of the both embodiments are substantially identical.

It will be understood that in the first embodiment, the control gear may be in the form of a ring as used in a conventional shutter to open and close shutter blades. Illustratively, the stepper motor is employed as a drive means, but any type of motor may be used as far as it can rotate in opposite directions and provides a predetermined holding torque in a deenergized state.

As stated above, according to the present invention, upon rotation of the drive gear, the control gear is positioned to face the non-tooth portion of the drive gear. The shutter blade is then rotated under the action of the biasing means to close the shutter opening. When the control gear comes into engagement with the drive gear, the shutter blade is active to open and close the shutter opening. Upon rapid opening and closing of the shutter blade, the resultant inertia may affect the meshing engagement of the drive gear and the control gear, but the control gear positively follows the drive gear. The shutter blade can thus be opened and closed without delay regardless of such rapid reverse rotation of the stepper motor M. This arrangement provides better performance of the shutter blade 7 in response to the stepper motor M at high speeds, and allows the shutter blade 7 to open and close according to programmed lens aperture and shutter speed. The correct exposure can be obtained, accordingly.

Also, the biasing force of the existing spring need not be increased in an effort to improve the operation of the shutter blade in response to the stepper motor at high speeds. This provides an improved operation of the shutter blade at high speeds, and minimize the consumption of electric current.

Upon depression of the shutter release button, the stepper motor is rotated in a clockwise direction to drive the shutter blade 7 toward a closed orientation. Immediately thereafter, the stepper motor M continues to rotate in the same direction. Thus, the shutter blade is highly responsive to the operation of the shutter release button to thereby properly carry out an exposure mode of operation.

Although the preferred embodiments of the present invention have been described in detail, it will be understood to those skilled in the art that various modifications and changes may be made therein without departing from the spirit of the invention and the scope of the appended claims.

What is claimed is:

1. A shutter for a single lens reflex camera, comprising a drive gear rotatable in opposite directions by a motor and having a non-tooth portion, a control gear directly or indirectly engageable with said drive gear, shutter blades driven by said control gear to open and close a shutter opening, and biasing means for constantly biasing said control gear in a direction to close the shutter opening, wherein upon rotation of said drive gear, said control gear is rotated to face the non-tooth portion of said drive gear whereby said shutter blades are moved under the action of said biasing means to close the shutter opening, and wherein when said control gear is brought into meshing engagement with said drive gear, said shutter blades are rendered operative to open and close the shutter opening.

* * * * *